United States Patent [19]

Thiel

[11] Patent Number: 4,915,929
[45] Date of Patent: Apr. 10, 1990

[54] ISOTOPIC SEPARATION OF D₂O FROM H₂O USING RUTHENIUM ADSORBENT

[75] Inventor: Patricia A. Thiel, Ames, Iowa

[73] Assignee: Iowa State University Research Foundation, Inc., Ames, Iowa

[21] Appl. No.: 148,369

[22] Filed: Jan. 25, 1988

[51] Int. Cl.⁴ .............................................. C01B 5/00
[52] U.S. Cl. ..................................... 423/580; 423/210
[58] Field of Search ...................... 423/648.1, 580, 210

[56] References Cited

U.S. PATENT DOCUMENTS

| | | | |
|---|---|---|---|
| 2,690,379 | 9/1954 | Urey et al. | 423/580 |
| 2,690,379 | 9/1954 | Urey et al. | 423/580 |
| 2,787,526 | 4/1957 | Spevack | 423/580 |
| 3,058,811 | 10/1962 | Shay | 423/580 |
| 3,681,021 | 8/1972 | Mikovsky | 423/580 |
| 3,700,417 | 10/1972 | Broughton | 423/580 |
| 3,888,974 | 6/1975 | Stevens | 423/580 |
| 3,900,557 | 8/1975 | Strathdee | 423/580 |
| 4,126,667 | 11/1978 | Butler et al. | 423/580 |
| 4,143,123 | 3/1979 | Butler et al. | 423/580 |
| 4,331,522 | 5/1982 | Pierini | 423/580 |
| 4,376,066 | 3/1983 | Bruggeman et al. | 423/580 |
| 4,411,798 | 10/1983 | Chan | 423/580 |

OTHER PUBLICATIONS

Japanese Magazine, "Shitsunai", issued on May, 1985, pp. 7 and 18.
West German Magazine, "md", issued on Mar., 1986, p. 7.
American Magazine, "Interiors", issued on Sep., 1985, p. 51.

Primary Examiner—John Doll
Assistant Examiner—Wayne A. Langel
Attorney, Agent, or Firm—Zarley, McKee, Thomte, Voorhees & Sease

[57] ABSTRACT

A method of enrichment of D₂O in solutions of D₂O in H₂O by contacting said solutions in the steam phase with hexagonal crystalline to produce enriched D₂O. The passages may be repeated to achieve a desired amount of D₂O.

8 Claims, 2 Drawing Sheets

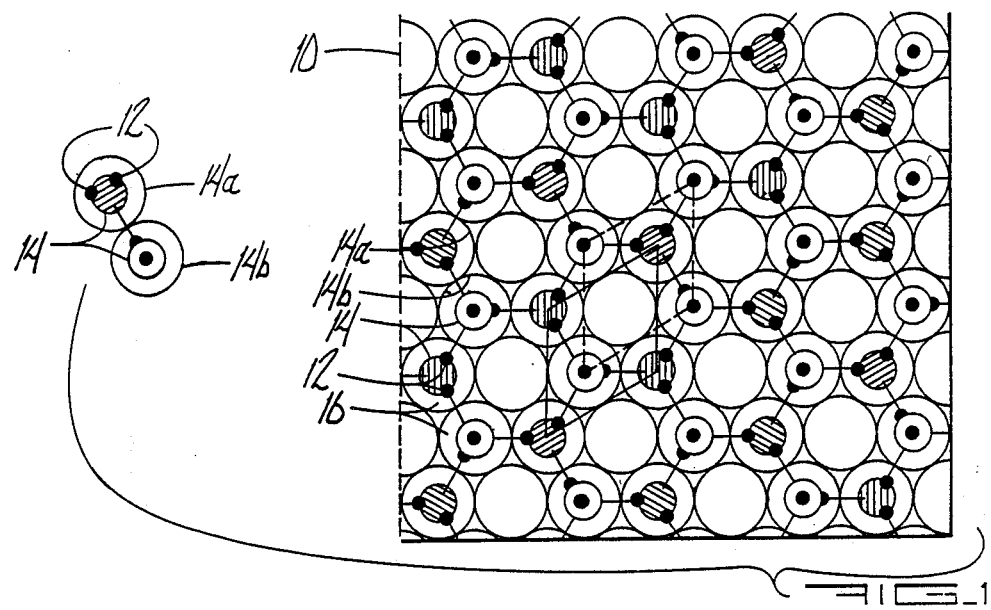
FIG_1
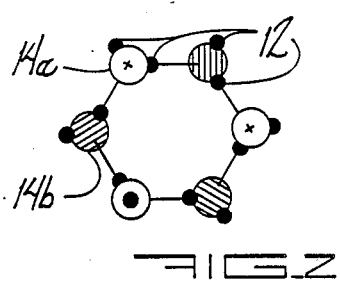
FIG_2
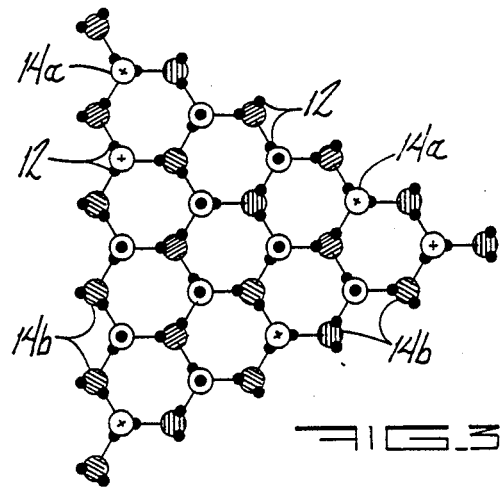
FIG_3
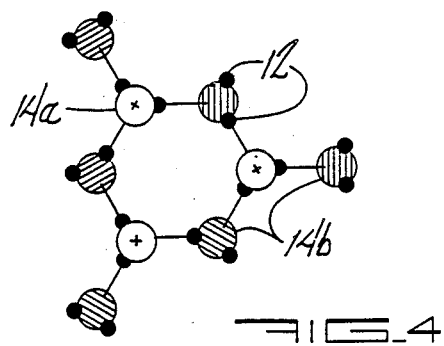
FIG_4

ISOTOPIC SEPARATION OF $D_2O$ FROM $H_2O$ USING RUTHENIUM ADSORBENT

The research for this invention was funded in part by the U.S. Department of Energy, Contact No. W-7405-ENG-82, and the government may have interests in this invention.

BACKGROUND OF THE INVENTION

Various methods and devices are known for the enrichment of $D_2O$ in solutions of $D_2O$ and $H_2O$. Deuterium oxide, $D_2O$, is useful in tracing, and as a moderator in nuclear reactors. There is therefore a continual need for $D_2O$ or heavy water.

A prior method of producing higher concentrations of $D_2O$ has involved isotopic exchange in the presence of a catalyst. For example, Urey, U.S. Pat. No. 2,690,379, issued Sept. 28, 1954, relates to a process for production of deuterium oxide by injecting hydrogen and water together into a column or reaction chamber, and catalyzing the equilibrium reaction wherein there is an exchange of the heavy and light isotopes. Butler, U.S. Pat. No. 4,126,667, issued Nov. 21, 1978, also relies upon this isotope exchange as an aqueous solution attempt to reach the equilibrium constant.

The present invention relies neither upon the injection of hydrogen into the aqueous solution, nor upon the isotope exchange which occurs relating to achievement of equilibrium. Instead, it is dependent upon molecular realignment changes which occur in a solution of $D_2O$ and $H_2O$, in the presence of a particular form of ruthenium.

Therefore, it is a primary object of this invention to provide for an improved method of enriching $D_2O$ in solutions of $D_2O$ with $H_2O$.

It is a further object to provide for enrichment of $D_2O$ by utilization of the discovery that $D_2O$ desorbs more quickly from a particular surface of crystalline ruthenium than does $H_2O$.

Yet another object of the invention is to provide for enrichment of $D_2O$ by passage of a solution of $D_2O$ in $H_2O$ in the steam phase over a fine particle high surface area of ruthenium (001).

SUMMARY OF THE INVENTION

A method for enriching $D_2O$ in solutions of $D_2O$ and $H_2O$ wherein the solution of $D_2O$ in $H_2O$ in a steam phase is exposed to the hexagonal surface of crystalline metal, and the $D_2O$ desorbs from the ruthenium more quickly than the $H_2O$, resulting in increased amounts of $D_2O$ in the $D_2O$ enriched end product.

BRIEF DESCRIPTION OF THE DRAWINGS

FIG. 1 shows the molecular formation of a water bi-layer absorbed onto a metal surface, such as ruthenium.

FIG. 2 shows the smallest bi-layer cluster.

FIG. 3 shows a large bi-layer cluster.

FIG. 4 shows a 9-molecular cluster.

DETAILED DESCRIPTION OF THE INVENTION

Figure 5:
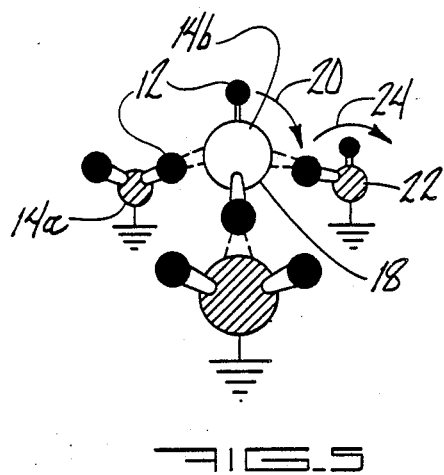
FIG. 5 is a side view of a portion of the molecular cluster, showing the first position.

In certain instances, $H_2O$ absorbed on metal surfaces results in ice-like structures which have a long range order. A close match in the lattice constant between $H_2O$ and the metal results in a strong water-substrate interaction. This type of long-range structure has been reported by those who have observed hexagonal patterns for epitaxial ice grown on certain metal surfaces, e.g., L. E. Firment and G. A. Somorjai, J. Chem. Phys. 63 (1975), 1037; Surface Sci. 84 (1979), 275. As completely reported by this inventor in P. Thiel, and T. Madey, The Interaction of Water with Solid Surfaces: Fundamental Aspects, Surface Sci. 7 (1987); and in P. J. Schmitz, J. A. Polta, S.-L Cheng and P. A. Thiel, Isotope Effect in Water Disorbtion From Ru(001) Surface Sci. 186 (1987) 219–331, incorporated herein by reference, there is considered to be a mismatch between a hexagonal crystalline ice lattice and the metal substrate. The metal surface acts as a template for the overlying ice layers which try to remain in registry with the substrate as closely as possible while maintaining the intramolecular separation of ice. A model has been proposed in which the $H_2O$ can form three-dimensionsal structures in which a first layer of water molecules is bound by direct chemisorption bonds, and molecules in the second layer are held by two or three hydrogen bonds to the first layer molecule. Supra. These two layers are called a "bi-layer".

In FIG. 1 is a schematic depiction of a perfect, infinite, absorbed water bi-layer, generally referred to at 10. The hydrogen atoms are shown as solid circles 12, while oxygen 14 is represented by open circles. Oxygen atoms in the first layer 14a are cross-hatched, while the open circles represent oxygen atoms in the second layer 14b. The bi-layer is shown absorbed to a metal substrate 16, such as ruthenium.

A particular surface of ruthenium, referred to be the Miller Index as ruthenium(0001) and which is also referred to by chemists in shorthand as ruthenium(001), shows a hexagonal structure quite similar to that of the water clusters. Ruthenium(001) describes a certain crystallographic plane exposed at the surface of bulk ruthenium metal, similar to that shown at the metal substrate 16 in FIG. 1. As is evident from FIG. 1, this makes for a good match between the water cluster bi-layer and the ruthenium. FIG. 2 shows the small hydrogen bonded bi-layer cluster, and its clearly hexagonal shape. This match between the lattice of ruthenium(001) and the water clusters assists in binding $H_2O$ to this form of ruthenium. Especially helpful is the fact that ruthenium crystallites preferentially expose the (001) face in nature and so the appropriate metal substrate is readily available.

Data revealed by the inventor in the above-incorporated references indicates that a structural conversion takes place in the $H_2O$ in the presence of ruthenium. The inventor's discoveries have shown that a rotational motion among water molecules is considered to be involved in the structural transition, a rotation which occurs far more slowly for $D_2O$ than for $H_2O$. As a result, $D_2O$ is desorbed from ruthenium(001) more quickly than $H_2O$.

Figure 6:
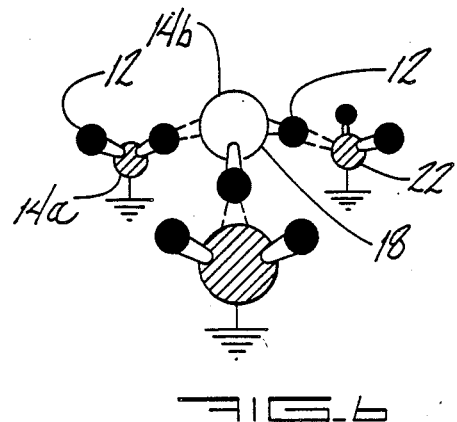
FIG. 6 is a side view showing the molecular cluster after rotation.

In a water cluster that is large, as shown in FIG. 3, so-called "flip-up" molecules are present in the middle of the cluster, which have O-H bonds perpendicular to the surface. These desorb preferentially, leaving the smaller clusters shown in FIG. 4. The smaller clusters are more stable and their dissolution results in a separate desorption rate at a higher temperature. FIGS. 3 and 5 show the state of arrangement referred to as $A_1$, and FIGS. 4 and 6 show the state referred to as $A_2$. The main difference between the large $A_2$ and small $A_1$ clusters is that the former contain molecules in a second layer with an O-H bond perpendicular to the surface, where the latter do not. All of the second layer molecules in the smaller $A_1$ clusters have OH bonds pointed only toward the first layer. In other words, the conversion from large to small clusters requires not only loss of water molecules, but also rearrangement among the remaining molecules. The rate of rearrangement must be sensitive to the difference in zero-point energies between $H_2O$ and $D_2O$.

While not wishing to be bound by any theory of why the invention works, it is believed that the oxygen atoms of the cluster remain in place, and rearrangement proceeds via rotation of at least two molecules, as illustrated in FIGS. 5 and 6. The formed molecule units shown in FIGS. 5 and 6 are components of the extended two layer clusters shown in FIGS. 3 and 4, respectively. Within the four molecule unit of FIG. 5, the second layer molecule labeled 18, rotates as shown at arrow 20, to a position pointing downward to one of the first layer molecules 22. Also, molecule 22 must rotate so that one O-H bond moves away from molecule 18, as shown at arrow 24. FIG. 6 shows the resulting formation. Either one or both of these rotations occur during the conversion.

Temperature and pressure are not critical to the process, as long as the temperature is sufficient to produce the solution in steam phase at or about 100° C. In temperature-programmed desorption experiments, desorption from the $A_1$ state is favored by slow heating rate; desorption from the $A_2$ state is enhanced by rapid heating rates. This has been interpreted to mean that conversion from the $A_2$ to $A_1$ states can occur, and the process of conversion is kinetically competitive with desorption from the $A_2$ state. Conversion occurs more slowly for $D_2O$ than $H_2O$, relative to $A_2$ desorption. In summary, as temperature increases during a thermal desorption experiment, activated structural rearrangement of some molecules occurs. These molecules would otherwise desorb in the $A_2$ state, but if they rearrange into the more stable configuration, they desorb in the $A_1$ state. Since rearrangement is faster, relative to desorption, for $H_2O$ than for $D_2O$, $D_2O$ resultingly desorbs from ruthenium(001) more quickly than $H_2O$, and the amount of $D_2O$ in the resulting gas phase is increased.

An apparatus in which this reaction can occur, may take a number of different forms, such as a packed column revealed in Butler, 4,126,667, or a packed column shown at Urey, 2,690,379. The physical structure of the apparatus may be varied, and may include a number of plates of packed ruthenium.

The ruthenium packed within the column is finely divided in a high surface area. The ruthenium needs to be of a particle size so that sufficient 001 face is exposed. Ruthenium black, with an average particle size of about 7 or 10 nanometers would be an example of a form with particles too small. Larger particles would be wasteful, in requiring a higher amount of ruthenium metal, while exposing the same amount of 001 face. In excess of 50 microns would be wasteful. The preferred size of the particles would be about one micron.

The solution of $D_2O$ and $H_2O$ is preferred to be presented in the steam phase, as that is more efficient in the degree of separation.

EXAMPLE

To demonstrate an embodiment of the invention, a ten-foot column is packed with ruthenium having a particle size of about one micron. A tap water solution of $D_2O$ and $H_2O$ is heated to approximately 100° C. and is injected into the column. The solution which passes out of the column, initially leaving the column, is highly concentrated in $D_2O$ with a lower percent of $H_2O$. In using a discreet component of $D_2O$ and $H_2O$, after several minutes a drop in the amount of $D_2O$ passing out the end of the column is noted, with a rise in $H_2O$. When the solution is exhausted, and the last of the steam passes through the end of the column, it is higher in percentage in $H_2O$, with low amounts of $D_2O$. At the injection port of the column it would be expected that the amount of $D_2O$ and $H_2O$ is approximately one part $D_2O$ in 6500 parts $H_2O$. The end product at the ejection port would be expected to detect a 1% increase in the amount of $D_2O$. This amount could be increased by taking the resulting solution, and subjecting it to sequential passages of the gas phase over the plates contained in the device, with continual enriching of the $D_2O$.

What is claimed is:

1. A one-phase method for enriching the concentration of $D_2O$ in solutions of $D_2O$ and $H_2O$ comprising contacting in the absence of hydrogen gas steam phase $D_2O$ and steam phase $H_2O$, with the hexagonal surface of crystalline ruthenium having a particle size greater than 10 nanometers so that sufficient (0001) face is exposed to produce enriched $D_2O$.

2. The method of claim 1 further comprising placing said ruthenium within a reaction chamber.

3. The method of claim 2 wherein said ruthenium is packed within said reaction chamber.

4. The method of claim 3 wherein said ruthenium is divided into particles in the range of greater than 10 nanometers so that sufficient ruthenium (0001) face is exposed up to 50 microns.

5. The method of claim 1 further comprising contacting said enriched $D_2O$ with said ruthenium(0001) repeatedly to produce a desired amount of enriched $D_2O$.

6. A one-phase method of enriching the concentration of $D_2O$ and solutions of $D_2O$ and $H_2O$ comprising contacting said $D_2O$ and $H_2O$ in the steam phase with the hexagonal surface of crystalline ruthenium wherein said ruthenium is divided into particles of about 1 micron to produce enriched $D_2O$.

7. A one-phase method of enriching the concentration of $D_2O$ in solutions of $D_2O$ and $H_2O$ comprising packing a column with ruthenium having particle size in the range greater than 10 nanometers so that sufficient (0001) face is exposed up to 50 microns; vaporizing said solution of $D_2O$ and $H_2O$; in the absence of hydrogen gas passing said $D_2O$ and $H_2O$ solution in the steam phase through said column vaporized to produce enriched $D_2O$; and repeating passages of said enriched $D_2O$ produced through said column to achieve an enrichment of $D_2O$.

8. A one-phase method of enriching the concentration of $D_2O$ in solution of $D_2O$ and $H_2O$ comprising packing a column with ruthenium having particle size of about 1 micron; passing said $D_2O$ and $H_2O$ solution in the steam phase through said column to produce enriched $D_2O$; and repeating passages of said enriched $D_2O$ produced through said column to achieve enrichment of $D_2O$.

* * * * *